United States Patent
Yamazaki et al.

(10) Patent No.: US 9,466,994 B2
(45) Date of Patent: Oct. 11, 2016

(54) MOBILE TERMINAL POWER RECEIVING MODULE UTILIZING WIRELESS POWER TRANSMISSION AND MOBILE TERMINAL RECHARGEABLE BATTERY INCLUDING MOBILE TERMINAL POWER RECEIVING MODULE

(71) Applicant: NITTO DENKO CORPORATION, Ibaraki-shi, Osaka (JP)

(72) Inventors: Hiroshi Yamazaki, Ibaraki (JP); Kojiro Kameyama, Ibaraki (JP); Eiji Toyoda, Ibaraki (JP); Hajime Sunahara, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 797 days.

(21) Appl. No.: 13/715,084

(22) Filed: Dec. 14, 2012

(65) Prior Publication Data
US 2013/0175984 A1      Jul. 11, 2013

(30) Foreign Application Priority Data
Jan. 5, 2012      (JP) ................... 2012-000553

(51) Int. Cl.
| | |
|---|---|
| *H02J 7/00* | (2006.01) |
| *H01F 38/14* | (2006.01) |
| *H01F 27/255* | (2006.01) |
| *H01F 27/32* | (2006.01) |
| *H02J 5/00* | (2016.01) |
| *H04B 5/00* | (2006.01) |

(52) U.S. Cl.
CPC .......... *H02J 7/0042* (2013.01); *H01F 27/255* (2013.01); *H01F 27/327* (2013.01); *H01F 38/14* (2013.01); *H02J 5/005* (2013.01); *H04B 5/0037* (2013.01); *H04B 5/0075* (2013.01)

(58) Field of Classification Search
CPC .................................. H02J 7/025; H02J 5/005
USPC .......................................................... 320/108
See application file for complete search history.

(56) References Cited

U.S. PATENT DOCUMENTS

| | | |
|---|---|---|
| 6,392,525 B1 * | 5/2002 | Kato et al. ............... 336/233 |
| 7,948,208 B2 | 5/2011 | Partovi et al. |
| 7,952,322 B2 | 5/2011 | Partovi et al. |

(Continued)

FOREIGN PATENT DOCUMENTS

| | | |
|---|---|---|
| EP | 2172952 A1 | 4/2010 |
| JP | H11251142 A | 9/1999 |

(Continued)

OTHER PUBLICATIONS

Extended European Search Report dated May 13, 2013, issued in corresponding European Patent Applilcation No. 12008447.0.

(Continued)

*Primary Examiner* — Suchin Parihar
(74) *Attorney, Agent, or Firm* — Westerman, Hattori, Daniels & Adrian, LLP

(57) ABSTRACT

A mobile terminal power receiving module 1 which is housed together with a rechargeable battery 3 in a rechargeable battery pack 2 in a mobile terminal such as a smart phone 5, includes a sheet coil 13 in which a coil 12 constituted by conductors is formed on a flexible circuit board 11 as a circuit pattern and a magnetic sheet 14 made of resin in which magnetic powder is dispersed.

10 Claims, 10 Drawing Sheets

(56) References Cited

U.S. PATENT DOCUMENTS

| | | | |
|---|---|---|---|
| 2002/0075116 A1 | 6/2002 | Peels et al. | |
| 2003/0048167 A1* | 3/2003 | Inoue et al. | 336/200 |
| 2008/0297295 A1* | 12/2008 | Yamazaki et al. | 336/90 |
| 2009/0015362 A1* | 1/2009 | Okada et al. | 336/65 |
| 2010/0001823 A1* | 1/2010 | Kawarai | 336/200 |
| 2010/0259352 A1* | 10/2010 | Yan et al. | 336/200 |
| 2011/0050164 A1* | 3/2011 | Partovi et al. | 320/108 |
| 2011/0050382 A1 | 3/2011 | Baarman et al. | |
| 2011/0210696 A1* | 9/2011 | Inoue | 320/108 |
| 2014/0022041 A1* | 1/2014 | Park et al. | 336/199 |
| 2014/0091758 A1* | 4/2014 | Hidaka et al. | 320/108 |
| 2014/0159502 A1* | 6/2014 | Shimokawa et al. | 307/104 |
| 2014/0265612 A1* | 9/2014 | Choi et al. | 307/104 |
| 2015/0236545 A1* | 8/2015 | Hyun et al. | 320/108 |

FOREIGN PATENT DOCUMENTS

| | | |
|---|---|---|
| JP | 2004047701 A | 2/2004 |
| JP | 2004186360 A | 7/2004 |
| JP | 2008159703 A | 7/2008 |
| JP | 2009124878 A | 6/2009 |
| JP | 2010-527226 A | 8/2010 |
| JP | 2011187559 A | 9/2011 |
| JP | 2011251142 A | 12/2011 |
| WO | 2008/137996 A1 | 11/2008 |

OTHER PUBLICATIONS

Office Action dated Feb. 4, 2015, issued in corresponding Chinese Patent Application No. 201310000862.X with English translation (12 pages).

Japanese Office Action dated Oct. 6, 2015 issued in counterpart Japanese patent application No. 2012-000553, with English translation (6 pages).

Office Action dated May 18, 2016, issued in Taiwanese Application No. 101146685, with English translation (11 pages).

* cited by examiner

MOBILE TERMINAL POWER RECEIVING MODULE UTILIZING WIRELESS POWER TRANSMISSION AND MOBILE TERMINAL RECHARGEABLE BATTERY INCLUDING MOBILE TERMINAL POWER RECEIVING MODULE

CROSS REFERENCE TO RELATED APPLICATION

The present application claims priority from Japanese Patent Application No. 2012-000553, which was filed on Jan. 5, 2012, the disclosure of which is herein incorporated by reference in its entirety.

BACKGROUND OF THE INVENTION

The present invention relates to a mobile terminal power receiving module implementing a wireless power transmission method of non-contact power transmission and a mobile terminal rechargeable battery having the mobile terminal power receiving module.

Hand-held mobile terminals such as note PCs, tablet PCs, digital cameras, and mobile phones (in particular smart phones) have rapidly become popular. Most of such mobile terminals are equipped with rechargeable batteries, and require periodic charging. To simplify the operation to charge the rechargeable battery of each mobile terminal, a growing number of devices charge the rechargeable battery by means of cordless power supply (wireless power transmission) utilizing electromagnetic induction between a power transmitting module and a power receiving module (e.g., Patent Literature 1 (PCT application entering national phase in Japan No. 2010-527226), Patent Literature 2 (U.S. Pat. No. 7,948,208 B2), and Patent Literature 3 (U.S. Pat. No. 7,952,322 B2)).

For example, Patent Literature 1 recites a device in which a receiver (power receiving module) that receives energy from a base unit (power transmitting module) which generates an alternate magnetic field by applying an alternate current to a winding, a coil, or any type of current-carrying wire and transmits the energy to a rechargeable battery is mounted on a mobile terminal (see FIG. 16).

SUMMARY OF THE INVENTION

In regard to the above, when a mobile terminal is provided with a power receiving module capable of cordless power supply along with a rechargeable battery, the thickness of the mobile terminal must be increased. On the other hand, to maintain the thickness of the mobile terminal, the rechargeable battery is required to be thin. This is disadvantageous in that the capacity of the battery must be reduced. In consideration of this problem, the reduction in the thickness, size, and weight of the power receiving module has been required.

Furthermore, high power and high efficiency are required in the wireless power transmission between the power transmitting module and the power receiving module. Moreover, because such high-power and highly-efficient wireless power transmission between the modules results in the generation of excessive heat, the improvement in heat radiation is also required.

An object of the present invention is to provide a thin, small, and light mobile terminal power receiving module implementing a wireless power transmission method for wireless transmission of electric power between a power transmitting module and a power receiving module, with improved heat radiation and high power transmission efficiency.

An aspect of the present invention for solving the problem above is a mobile terminal power receiving module, implementing a wireless power transmission method of transmitting electric power between a power transmitting module and a power receiving module by wireless, including: a sheet coil in which at least one coil constituted by conductors is formed on a substrate as a circuit pattern; and a magnetic sheet made of resin in which magnetic powder is dispersed.

According to the arrangement above, because the magnetic sheet including the resin is adhesive itself, it is possible to mount the mobile terminal power receiving module in the mobile terminal by adhering the module to the mobile terminal, thanks to the adhesiveness of the magnetic sheet. It is therefore unnecessary to use an adhesive which has been required to mount a power receiving module in a mobile terminal, and hence the reduction in thickness, size, and weight of the mobile terminal is realized. Furthermore, the heat radiation is improved because heat generated by the coil is radiated through the sheet coil and the magnetic sheet.

According to another aspect of the present invention for solving the problem above, in the sheet coil, the at least one coil is provided on each of a top surface and a bottom surface of the substrate as the circuit pattern, and a gap between the conductors of the coil provided on the bottom surface of the substrate is filled with the magnetic sheet.

According to the arrangement above, even if the at least one coil are provided on the top and bottom surfaces of the substrate to secure a sufficient number of spiral arms of the coil, the coil on the bottom surface of the substrate is embedded in the magnetic sheet because parts of the magnetic sheet fill the gap between the conductors of the coil on the bottom surface of the substrate. The overall thickness of the power receiving module is reduced with this arrangement.

According to another aspect of the present invention for solving the problem above, the mobile terminal power receiving module is arranged so that, on the top surface of the substrate, only a gap between the conductors of the coil on the top surface of the substrate is filled with the magnetic sheet.

According to the arrangement above, because on the top surface of the substrate only the gap between the conductors of the coil is filled with the magnetic sheet, the efficiency in the power transmission from the power transmitting module to the power receiving module is improved.

According to another aspect of the present invention for solving the problem above, the mobile terminal power receiving module is arranged so that the magnetic sheet is provided to cover the at least one coil provided on the bottom surface of the substrate.

According to the arrangement above, the efficiency in power transmission from the power transmitting module to the power receiving module is improved by providing the magnetic sheets on the top and bottom surfaces. On the top surface side of the substrate, a magnetic flux is not blocked at the time of power transmission from the power transmitting module, because only the gap between the conductors of the coil is filled with the magnetic sheet. On the other hand, on the bottom surface side of the substrate, the coil is covered by the magnetic sheet not only at the gap between the conductors of the coil but also in its entirety, and hence a magnetic flux is blocked.

According to another aspect of the present invention for solving the problem above, the mobile terminal power receiving module is arranged so that, in the magnetic sheet, the magnetic powder dispersed in the resin is insulation-coated.

According to the arrangement above, because the magnetic powder is insulation-coated, the short-circuiting between the conductors of the coil is prevented even if the gap between the conductors of the coil is filled with the magnetic sheet.

According to another aspect of the present invention for solving the problem above, the mobile terminal power receiving module is arranged so that, the volume ratio of the insulation-coated magnetic powder to the magnetic sheet falls within a range of 60 Vol % to 90 Vol %.

According to the arrangement above, because the magnetic powder is insulation-coated, the efficiency in power transmission is improved while the short-circuiting between the conductors of the coil is prevented, even if the gap between the conductors of the coil is filled with the magnetic sheet including the magnetic powder at high density.

According to another aspect of the present invention for solving the problem above, the mobile terminal power receiving module is arranged so that, the magnetic sheet includes a low-density layer in which the density of the magnetic powder with respect to the resin is low at a part closely contacting the at least one coil and a high-density layer in which, at a part not closely contacting the at least one coil, the density of the magnetic powder dispersed in the resin is higher than the density in the low-density layer.

According to the arrangement above, because in the magnetic sheet the low-density layer in which the density of the magnetic powder is low is provided at a part closely contacting the coil, the short-circuiting of the conductors of the coil is prevented even if the gap between the conductors of the coil is filled with the magnetic sheet. On the other hand, the efficiency in power transmission is improved because the high-density layer in which the density of the magnetic powder dispersed in the resin coil is higher than the density in the low-density layer is provided at a part not closely contacting the coil.

According to another aspect of the present invention for solving the problem above, the mobile terminal power receiving module is arranged so that, the magnetic sheet includes a low magnetic permeability layer in which the magnetic powder dispersed in the resin has a low magnetic permeability at a part closely contacting the at least one coil and a high magnetic permeability layer in which, at a part not closely contacting the at least one coil, the magnetic powder dispersed in the resin has a magnetic permeability higher than the magnetic permeability of the low magnetic permeability layer.

According to the arrangement above, because in the magnetic sheet the low magnetic permeability layer in which the magnetic permeability of the resin dispersed I the resin is low is provided at a part closely contacting the coil, the short-circuiting of the conductors of the coil is prevented even if the gap between the conductors of the coil is filled with the magnetic sheet. On the other hand, the efficiency in power transmission is improved because the high magnetic permeability layer in which the magnetic permeability of the magnetic powder dispersed in the resin is higher than that of the low magnetic permeability layer is provided at a part not closely contacting the coil.

According to another aspect of the present invention for solving the problem above, the mobile terminal power receiving module is arranged so that, in the magnetic sheet, the resin in which the magnetic powder is dispersed is in B-stage.

This arrangement makes it possible to improve the adhesion property of the magnetic sheet.

According to another aspect of the present invention for solving the problem above, the mobile terminal power receiving module is arranged so that the magnetic sheet is made of an adhesive instead of the resin.

According to this arrangement, because the adhesive is used instead of the resin, the adhesion property of the magnetic sheet is further improved.

Another aspect of the present invention for solving the problem above is a mobile terminal rechargeable battery provided with the mobile terminal power receiving module described above.

This arrangement makes it possible to provide a mobile terminal rechargeable battery having a thin-film-shaped mobile terminal power receiving module. Because the mobile terminal power receiving module is formed to be thin, the capacity of the mobile terminal rechargeable battery is sufficiently large.

It is possible to provide a thin, small, and light mobile terminal power receiving module implementing a wireless power transmission method for wireless transmission of electric power between a power transmitting module and a power receiving module, with improved heat radiation and high power transmission efficiency.

DESCRIPTION OF THE PREFERRED EMBODIMENTS

First Embodiment

A mobile terminal power receiving module 1 according to First Embodiment will be described with reference to figures.

(Outline of Mobile Terminal Power Receiving Module 1)

Figure 1:
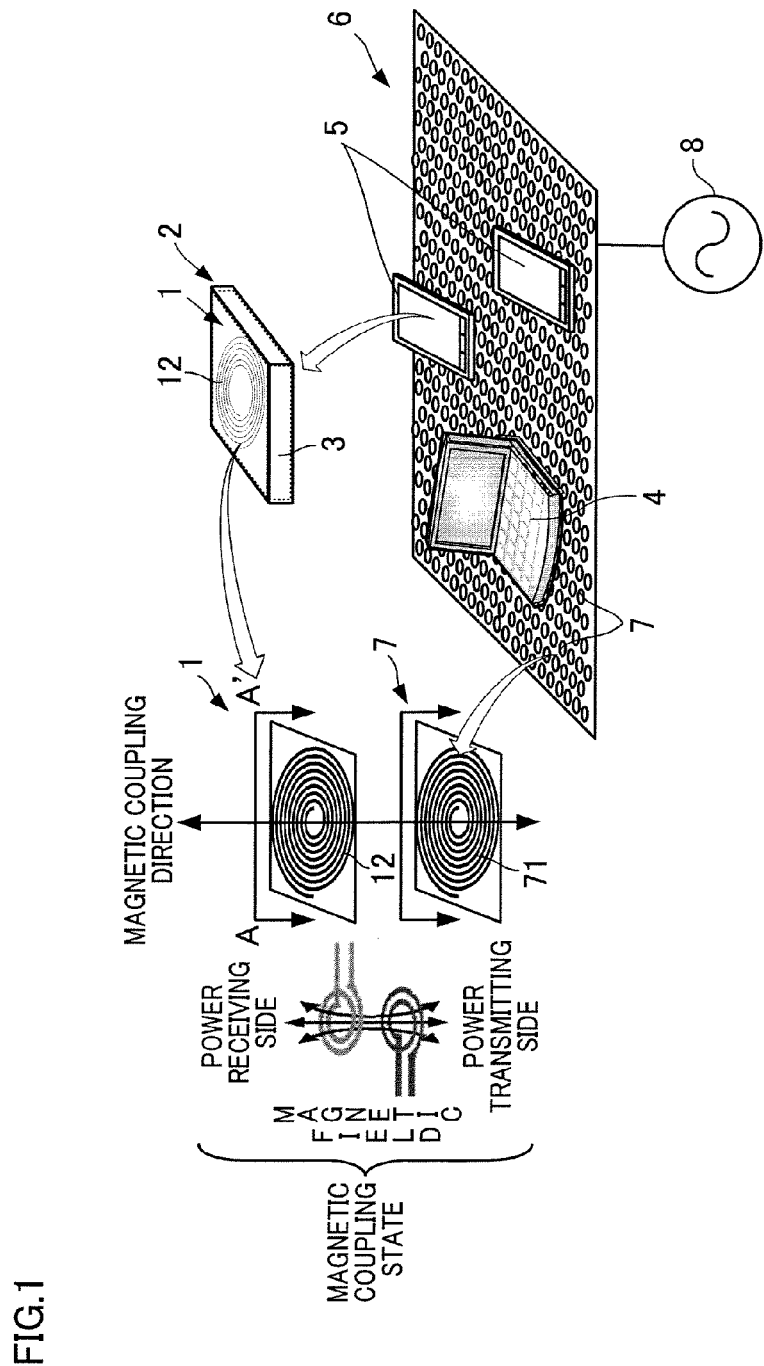
FIG. 1 is a schematic diagram of a mobile terminal power receiving module according to First Embodiment.

As shown in FIG. 1, the mobile terminal power receiving module 1 is used in the state of being housed, along with a rechargeable battery 3, in a rechargeable battery pack 2 of a note PC 4 or a smart phone 5. The mobile terminal power receiving module 1 is paired with a plurality of power transmitting modules 7 embedded in a power transmission sheet 6, and an induced electromotive force is generated by magnetic coupling between the mobile terminal power receiving module 1 and the power transmitting modules 7. With this, the mobile terminal power receiving module 1 is able to receive electric power from the power transmitting modules 7 in a wireless manner. The rechargeable battery 3 is charged with the received electric power. In addition to the above, the mobile terminal power receiving module 1 may be used for a tablet PC, a digital camera, a mobile phone or the like, which has a rechargeable battery rechargeable by cordless power supply using electromagnetic induction or cordless power supply using magnetic resonance.

Figure 2:
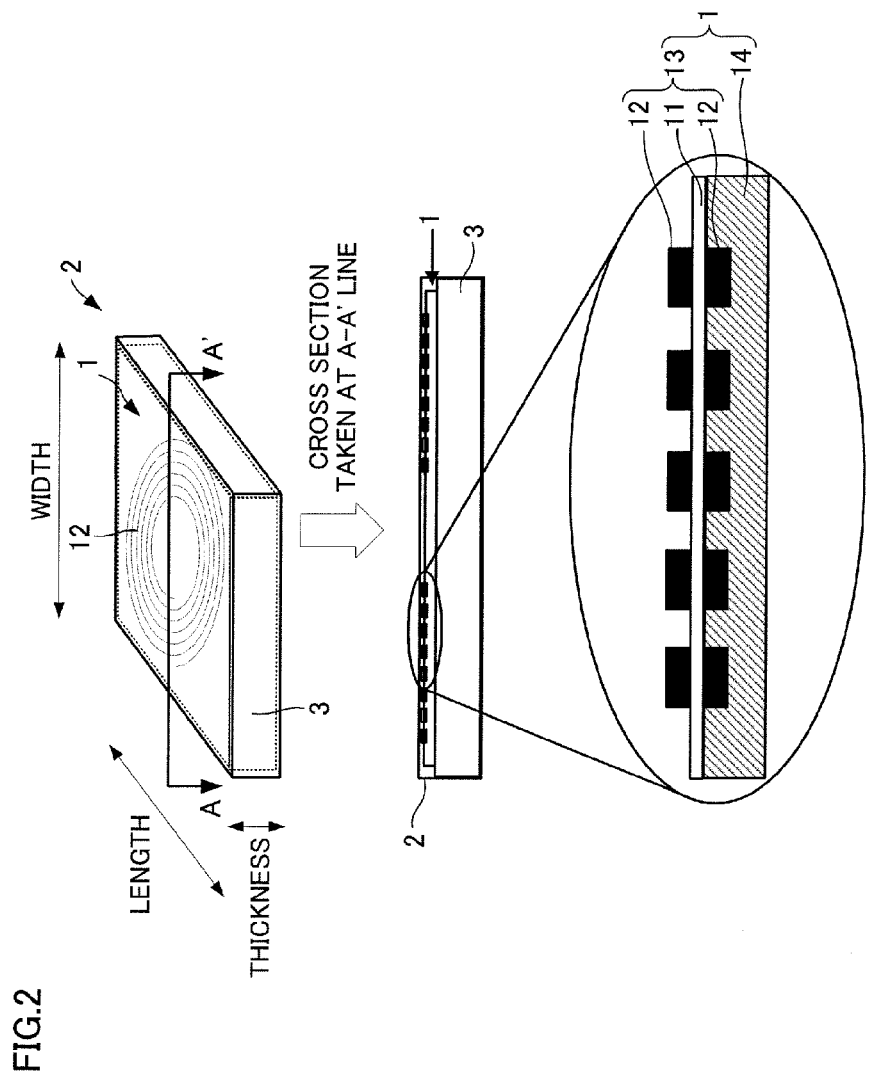
FIG. 2 illustrates the structure of the mobile terminal power receiving module of First Embodiment.

As shown in FIG. 2, the mobile terminal power receiving module 1 above includes a sheet coil 13 in which a coil 12 constituted by conductors is formed on a substrate 11 as a circuit pattern and a magnetic sheet 14 made of resin in which magnetic powder is dispersed. It is noted that the power transmitting modules 7 are structured in a similar manner as the mobile terminal power receiving module 1.

Note that, the magnetic coupling direction shown in FIG. 1 is a direction in which the centers of the magnetic coupling side (power transmitting side) and the magnetic coupled side (power receiving side) are connected with each other when the magnetic coupling side and the magnetic coupled side oppose each other and the magnetic coupling force therebetween is the largest and hence the largest induced electromotive force is generated, as in a case where the center of a power-receiving mobile terminal power receiving module 1 opposes the center of a power-transmitting power transmitting module 7.

According to the arrangement above, because the magnetic sheet 14 including resin is adhesive, it is possible to adhere the mobile terminal power receiving module 1 to the rechargeable battery 3 thanks to the adhesiveness of the magnetic sheet 14. The mobile terminal power receiving module can be mounted in a mobile terminal such as a smart phone 5 in this way. It is therefore unnecessary to use an adhesive which has been required to mount a power receiving module in a smart phone 5, and hence the reduction in thickness, size, and weight of the smart phone 5 is realized. Furthermore, the heat radiation is improved because heat generated by the coil 12 is radiated through the sheet coil 13 and the magnetic sheet 14.

Now, regarding the mobile terminal power receiving module 1 of the present embodiment, how electric power is supplied from the power transmitting modules 7 to the mobile terminal power receiving module 1 by utilizing electromagnetic induction will be detailed.

(Structure of Mobile Terminal Power Receiving Module 1)

As shown in FIG. 2, the mobile terminal power receiving module 1 is stored in the rechargeable battery pack 2 in the state of being adhered to the rechargeable battery 3. This mobile terminal power receiving module 1 includes a sheet coil 13 in which a coil 12 constituted by conductors is formed on a substrate 11 as a circuit pattern and a magnetic sheet 14 made of resin in which magnetic powder is dispersed. The rechargeable battery 3 in this case is a lithium ion battery that is 32 mm in length, 46 mm in width, and 4.5 mm in thickness.

(Sheet Coil 13)

The substrate 11 which is a part of the sheet coil 13 is a flexible circuit board 11 on either surface of which a circuit pattern can be formed. According to the present embodiment, as shown in FIG. 2, the flexible circuit board 11 is a thin plate (sheet) that is 32 mm in length, 46 mm in width, and 30 μm in thickness (the thickness falls within the range of 12 μm to 75 μm, preferably 12 μm to 25 μm). On each of the top and bottom surfaces of the flexible circuit board 11, a copper foil which is 60 μm thick (is 18 μm to 75 μm thick, preferably 35 μm to 50 μm thick) is attached. Furthermore, the coil 12 is formed in such a way that a copper foil on each of the top and bottom surfaces of the flexible circuit board 11 is manufactured to be a flat spiral coil in a later-described subtractive process. With this, the coils 12 formed on the top surface and the bottom surface of the flexible circuit board 11 protrude from the respective surfaces of the flexible circuit board 11 for about 60 μm. It is noted that the coil 12 formed on the top surface of the flexible circuit board 11 is connected to the coil 12 formed on the bottom surface by a through hole made through the flexible circuit board 11. Furthermore, the length and width of the flexible circuit board 11 are suitably determined in accordance with the length and width of the rechargeable battery 3.

In addition to the above, each coil 12 is connected to an unillustrated rectifier at both ends. The rectifier rectifies AC power generated by electromagnetic induction into DC power, so as to charge the rechargeable battery 3.

As shown in FIG. 1, a coil 71 provided on the power transmitting module 7 is connected to a power source 8 at both ends, and hence AC power can be supplied at any frequencies.

(Magnetic Sheet 14)

Figure 3:
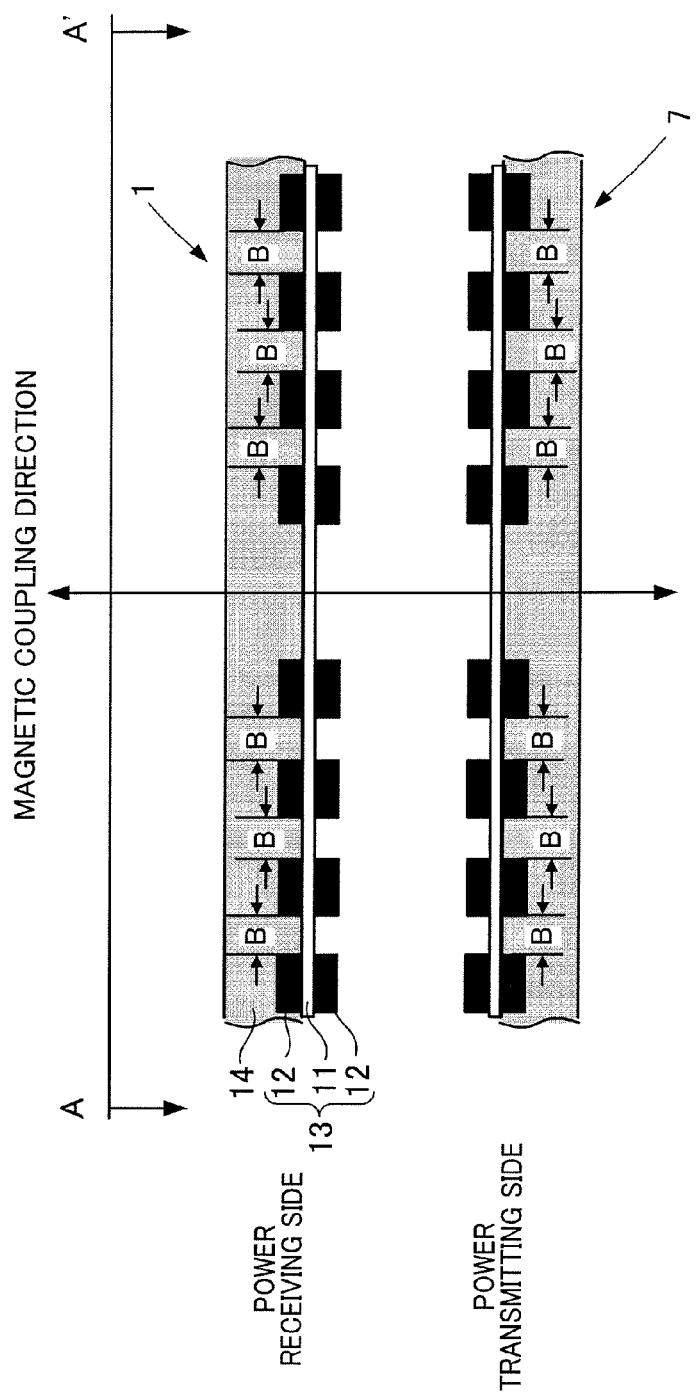
FIG. 3 illustrates the mobile terminal power receiving module of First Embodiment.

The length and width of the magnetic sheet 14 are arranged to be identical with those of the substrate 11, i.e., 32 mm in length and 46 mm in width. The thickness of the magnetic sheet 14 is 370 μm (falls within the range of 5 μm to 600 μm, preferably 50 μm to 500 μm). The magnetic sheet 14 is therefore a thin film. As shown in FIG. 3, the magnetic sheet 14 is closely adhered to the walls of the coil 12 on the bottom surface of the flexible circuit board 11 so as to fill gaps B formed between the conductors of the coil 12.

(Magnetic Sheet 14: Resin)

The magnetic sheet 14 is made of resin in which magnetic powder is dispersed. The resin may be thermosetting resin or thermoplastic resin, on condition that the resin has adhesiveness to the rechargeable battery 3 and the reliability of the adhesiveness is maintained for a long period of time. Examples of thermosetting resins include epoxy resin, phenol resin, melamine resin, vinyl ester resin, cyano ester resin, maleimide resin, and silicon resin. Examples of thermoplastic resins include acrylic resin, vinyl acetate resin, and polyvinyl alcohol resin. In the present embodiment, mixed resin mainly composed of epoxy resin is used in consideration of the reliability of the adhesiveness and the reliability of the insulation. (Details will be given later). Non-limiting examples of the epoxy resin include triphenylmethane epoxy resin, dicyclopentadiene epoxy resin, cresol novolac epoxy resin, phenol novolac epoxy resin, bisphenol A epoxy resin, bisphenol F epoxy resin, denatured bisphenol A epoxy resin, denatured bisphenol F epoxy resin, biphenyl epoxy resin, and phenoxy resin. These epoxy resins may be used alone or in mixture of two or more kinds.

In addition to the above, to the epoxy resin, known phenol resin, acid anhydride, amine compound, or the like may be added as a hardener. Furthermore, the epoxy resin may include an elastomer component. With this elastomer component, flexibility and elasticity are imparted to the sheet-shaped magnetic sheet 14. The elastomer component is not limited to any particular type as long as flexibility and elasticity are imparted to the sheet-shaped magnetic sheet 14. Examples of the elastomer component include acrylic copolymers such as polyacrylic ester, styrene acrylate copolymer, and rubber polymer such as butadiene rubber, styrene-butadiene rubber (SBR), ethylene vinyl acetate copolymer (EVA), isoprene rubber, and acrylonitrile rubber.

Among them, acrylic copolymer is preferably selected as the elastomer component on account of its property of being easily dispersed in the epoxy resin. The elastomer components above may be used alone or in mixture of two or more kinds. The acrylic copolymer is synthesized by, for example, conducting radical polymerization of acrylic monomer mixture having a predetermined mixture ratio, by means of a usual method.

Furthermore, to facilitate the hardening of the epoxy resin, a hardening accelerator may be added to the epoxy resin. Known hardening accelerators such as an amine compound, a phosphorus compound, an imidazole compound or the like may be used. Among them, the imidazole compound is preferable because of its high reactivity.

(Magnetic Sheet 14: Magnetic Powder)

In the magnetic sheet 14, magnetic powder is dispersed in the resin above. The magnetic powder is soft magnetic powder. In the present embodiment, gas-atomized powder Fe-3% Si made by Sanyo Special Steel Co., Ltd. having the particle size of 106 μm or lower is used. Non-limiting examples of the soft magnetic powder include pure Fe, Fe—Si, Fe—Al—Si (sendust), Fe—Ni (permalloy), Finemet (made by Hitachi Metals, Ltd.), soft ferrite, Fe-based amorphous, Co-based amorphous, and Fe—Co (permendur).

The present embodiment employs soft magnetic powder having the particle size of 106 μm or lower. The average particle size of the soft magnetic powder dispersed in the resin may be 5 μm to 200 μm, preferably 50 μm to 100 μm. The average particle size of the soft magnetic powder is restrained to be 200 μm or lower because, when the average particle size of the soft magnetic powder is higher than 200 μm, the thickness of the magnetic sheet 14 is increased on the contrary to the object of the present invention, that is to produce a thin mobile terminal power receiving module 1. In the meanwhile, the average particle size of the soft magnetic powder is arranged to be not lower than 5 μm because, when the average particle size is lower than 5 μm, the influence of the diamagnetic field becomes conspicuous, and it becomes unlikely to achieve good absorption properties on account of the degradation in the magnetic permeability.

Furthermore, in the magnetic sheet 14, the soft magnetic powder is prepared such that an amount of the added resin accounts for 50 vol % to 99 vol % (preferably 60 vol % to 90 vol %) in the volume ratio.

In addition to the above, the surfaces of the soft magnetic powder particles dispersed in the resin are coated with a silica layer for insulation. The insulation coating on the soft magnetic powder surfaces is not limited to silica. Phosphate glass (such as Somaloy 500 of Hoganas AB) may be used, for example. The step of insulation coating on the magnetic powder will be described later.

(Operations)

Figure 4:
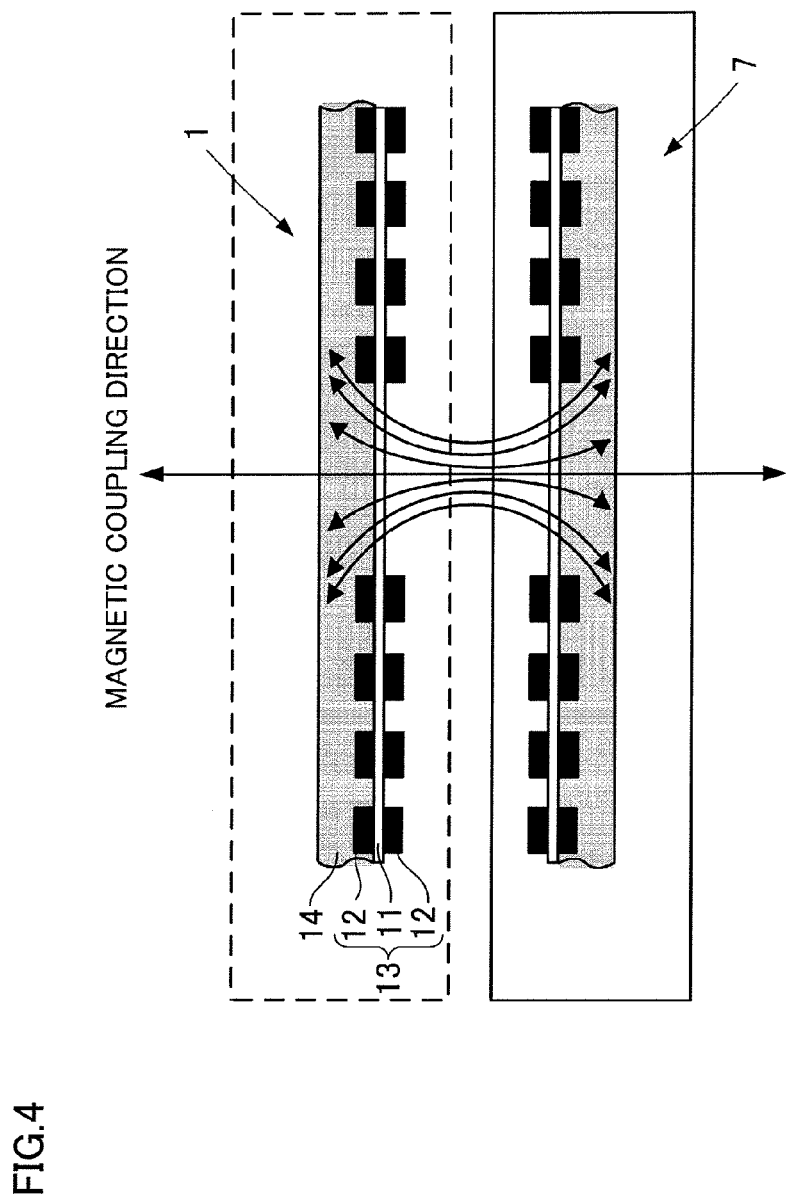
FIG. 4 illustrates the state of a magnetic field of the mobile terminal power receiving module of First Embodiment.

With the arrangement above, as shown in FIG. 1, as the power source 8 is connected to each power transmitting module 7 of the power transmission sheet 6 and a high-frequency alternate current (AC power) is supplied, the power transmitting module 7 generates an alternate magnetic field by means of electromagnetic induction. The coil 12 of the mobile terminal power receiving module 1 housed in the rechargeable battery pack 2 of the smart phone 5 conducts magnetic coupling and interlinks with the alternate magnetic field, with the result that a induced electromotive force is generated. The AC power generated by the induced electromotive force is rectified to DC power by the rectifier, and the rechargeable battery 3 is charged therewith. In this regard, as shown in FIG. 4, the mobile terminal power receiving module 1 is arranged so that, on the cross section along the magnetic coupling direction, the gaps between the conductors of the coil 12 are filled with the magnetic sheet 14, so that the conductors and the parts of the magnetic sheet 14 are provided in an alternate manner. On account of this arrangement, a magnetic field not contributing to the magnetic coupling around the coil 12 is reduced and the overall spread of the magnetic field is restrained in the mobile terminal power receiving module 1, as compared to cases where the gaps of the coil 12 are not filled with the magnetic sheet 14. As a result, in the mobile terminal power receiving module 1 the magnetic flux density from the power transmitting module 7 toward the mobile terminal power receiving module 1 is increased. For this reason, the mobile terminal power receiving module 1 is able to receive power with a high power transmission efficiency from the power transmitting module 7.

In addition to the above, inside the mobile terminal power receiving module 1, a magnetic field generated on account of the flow of an alternate current into a coil 12 interlinks with another coil 12 provided in parallel to the coil 12 so that an induction current is generated, and such an induction current functions as resistance. This problem is restrained by the magnetic sheet 14 filling the gaps B of the coil 12. As such, the power receiving with a high power transmission efficiency is realized by a high magnetic flux density and reduction in the resistance caused by an induction current.

In addition to the above, because heat generated by the coil 12 is efficiently transferred via the magnetic sheet 14 filling the gaps B of the coil 12, the heat generated by the coil 12 is efficiently radiated.

(Manufacturing Method of Mobile Terminal Power Receiving Module 1)

Now, a manufacturing method of the mobile terminal power receiving module 1 will be described.

(Process of Forming Sheet Coil 13)

To begin with, the process of forming the sheet coil 13 will be described. A through hole is made through the flexible circuit board 11 on each of the top and bottom surfaces of which a copper foil is formed. The hole is plated with copper, with the result that the top and bottom surfaces of the flexible circuit board 11 are electrically connected with each other. Subsequently, the copper foils formed on the top and bottom surfaces of the flexible circuit board 11 are masked with ink or paint, which functions as a corrosion-resistant film in silkscreen printing, to be shaped as a spiral flat coil, and the copper foils are etched by a metal corrosive agent. As a result, flat spiral coils 12 are formed (subtractive process). As such, the sheet coil 13 in which the coils 12 are formed on the top and bottom surfaces of the flexible circuit board 11 as circuit patterns is formed.

(Process of Forming Magnetic Sheet 14)

Now, the process of forming the magnetic sheet 14 will be described.

(Insulation Coating Step)

To begin with, the step of performing insulation coating of the soft magnetic powder dispersed in the resin will be described. By diluting thermosetting silicone resin KR220L (made by Shin-Etsu Chemical Co., Ltd.) by toluene, silicone resin varnish with the solid content density of 10 wt is formed. Subsequently, as the soft magnetic powder, gas-atomized powder Fe-3% Si made by Sanyo Special Steel Co., Ltd. with the particle size of 106 μm or lower is prepared. This gas-atomized powder Fe-3% Si is soft magnetic powder with less amount of impurities thanks to gas atomization. The gas-atomized powder Fe-3% Si is three-dimensionally flown by a rotating fluid bed equipment (made by Powrex Corporation) capable of performing three-dimensional powder flow, and by spraying the silicone resin varnish diluted by toluene thereon, the surfaces of the particles of the gas-atomized powder Fe-3% Si are coated with the toluene-diluted silicone resin varnish.

Thereafter, the gas-atomized powder Fe-3% Si coated with the silicone resin varnish is subjected to thermal treatment at 470 degrees centigrade for about an hour in nitrogen atmosphere, so that the organic components are removed from the silicon resin varnish, and a silica layer is formed on the surface of each particle of the gas-atomized powder Fe-3% Si.

Alternatively, to perform insulation coating of the surface of each particle of the magnetic powder by a silica layer, the silica layer may be formed by physically applying silicone resin or the like onto the magnetic powder and then performing thermosetting. Alternatively, a silica layer may be formed on the surface of each particle of the magnetic powder by a sol-gel process or the like, with silicon alkoxide such as TEOS being employed as a starting material. Alternatively, an insulating film glass layer may be formed on the surface of each particle of the magnetic powder by a phosphate glass process called "parkerizing".

(Process of Preparing Resin)

Now, the process of preparing the resin in which the soft magnetic powder is dispersed will be described. The resin is prepared by putting, in a container, 1.34 g of epoxy resin EXA-4850-150 (made by DIC Corporation), 0.57 g of epoxy resin EPPN-501HY (made by Nippon Kayaku Co., Ltd.), 0.67 g of phenol resin GS-200 (made by Gun Ei Chemical Industry Co., Ltd.), and 105.3 g of acrylic rubber (copolymer of butylacrylate:acrylonitrile:glycidyl methacrylate=85:8:7 weight % and weight-average molecular weight of 0.8 million). It is noted that the acrylic rubber is diluted with methyl ethyl ketone (MEK) so that the percentage by weight of the acrylic rubber consists is 85 wt %. The methyl ethyl ketone (MEK) is used in consideration of the facilitation of the mixture of the materials and the solubility of the materials. The mixed resins are agitated and mixed by a dissolver, with the result that mixed resin evenly dissolved in a methyl ethyl ketone solvent is generated.

(Process of Dispersing Magnetic Powder)

To the mixed resin in the methyl ethyl ketone solvent generated in the process of preparing resin above, 331 parts by weight of gas-atomized powder Fe-3% Si having been coated with the silica layer in the insulation coating process above is introduced. The mixed resin is agitated and mixed again in the dissolver, with the result that the gas-atomized powder Fe-3% Si coated with the silica layer is evenly dispersed in the mixed resin.

(Process of Preparing Hardening Accelerator)

To the mixed resin generated in the process of dispersing the magnetic powder above, 0.1 g of 2-methylimidazole (made by Shikoku Chemicals Corporation) is introduced, and then the mixed resin is agitated and mixed by the dissolver again.

(Process of Forming Sheet Shape)

Subsequently, on the silicon-treated surface of a tabular PET film, the mixed resin having been mixed in the process of preparing the hardening accelerator above is applied by an applicator, to form a thin film on the surface. The PET film may be replaced with a plastic base made of a material such as polyester, polyamide, polyphenylene sulfide, polyimide, and polyethylene naphthalate, a porous base of these materials, a paper base such as glassine, fine paper, and Japanese paper, nonwoven fabric of cellulose, polyamide, polyester, aramid, or the like, or a metal film base such as copper foil, aluminum foil, SUS foil, and nickel foil.

Then the mixed resin applied to the surface of the PET film is dried for three minutes at 110 degrees centigrade by using a dryer, so as to be transitioned to the B-stage. As a result, a sheet-shaped mixed resin which is in B-stage and 185 µm thick is obtained on the surface of the PET film. The B-stage indicates a state in which thermosetting resin is half-cured. Such thermosetting resin in B-stage is not fully cured, and is therefore easily adhered to an object at normal temperatures or after being heated if necessary. It is noted that the temperature and duration of the drying must be suitably adjusted in consideration of the type and thickness of the resin.

Subsequently, a plurality of the B-stage mixed resin sheets are laminated to attain a suitable thickness, by a hydraulic laminator set at 90 degrees centigrade. In the present embodiment, two B-stage mixed resin sheets are laminated to attain the thickness of 370 µm, so that the magnetic sheet 14 is formed.

(Process of Pasting Sheet Coil 13 onto Magnetic Sheet 14)

Subsequently, the sheet coil 13 is superposed onto the magnetic sheet 14 and vacuum pressing is conducted from above and below. The vacuum pressing is conducted in such a way that, by using a pressurizing vacuum laminator, pressurization is carried out for one minute at a temperature of 100 degrees centigrade and under a pressure of 1 MPa, after a vacuum is obtained. In consideration of the type of the resin, the thickness of the resin, and manufacturing environment, the pressure is adjusted within the range of 0.5 to 10 MPa, the pressurizing time is adjusted within the range of 30 seconds to 10 minutes, and the heating temperature is adjusted within the range of 50 degrees centigrade to 150 degrees centigrade (preferably in the range of 70 degrees centigrade to 130 degrees centigrade).

Because the magnetic sheet 14 is in B-stage as above, as the sheet coil 13 is superposed onto the B-stage magnetic sheet 14 and pressurization is conducted, the coil 12 on the bottom surface of the flexible circuit board 11 closely contacts and adheres the B-stage sheet coil 13. That is to say, as the coil 12 having the gaps B between the neighboring conductors is superposed onto the B-stage magnetic sheet 14 and pressurization is conducted, the B-stage magnetic sheet 14 enters the gaps B, and the adhesion is achieved for the reason that the magnetic sheet 14 closely contacts the gaps B. Furthermore, the generation of bubbles in the magnetic sheet 14 is prevented on account of the vacuum pressing.

Through the process of pasting the sheet coil 13 onto the magnetic sheet 14, the mobile terminal power receiving module 1 is completed.

In the mobile terminal power receiving module 1 described above, because the magnetic sheet 14 including the resin is adhesive itself, the magnetic sheet 14 of the mobile terminal power receiving module 1 is adhered to the rechargeable battery 3 by utilizing the adhesiveness of the magnetic sheet 14. As such, the module 1 is incorporated into a mobile terminal such as a smart phone 5. It is unnecessary in this arrangement to use an adhesive which is conventionally required to incorporate a power receiving module into a smart phone 5, and hence the reduction in thickness, size, and weight of the smart phone 5 is realized. Furthermore, because heat generated by the coil 12 is radiated through the sheet coil 13 and the magnetic sheet 14, the heat radiation is improved.

In addition to the above, in the sheet coil 13 of the mobile terminal power receiving module 1, the coils 12 are formed on the top and bottom surfaces of the flexible circuit board 11 as circuit patterns, and the gaps B between the conductors of the coil 12 on the bottom surface of the flexible circuit board 11 are filled with the magnetic sheet 14. For this reason, even if the coils 12 are provided on the top and bottom surfaces of the flexible circuit board 11 to secure a sufficient number of spiral arms of the coils 12, the coil 12 on the bottom surface of the flexible circuit board 11 is embedded in the magnetic sheet 14 because parts of the magnetic sheet 14 fill the gaps B between the conductors of the coil 12 on the bottom surface of the flexible circuit board 11. The overall thickness of the mobile terminal power receiving module 1 is reduced with this arrangement.

In addition to the above, because in the mobile terminal power receiving module 1 the magnetic sheet 14 is provided to cover the coil 12 on the bottom surface of the flexible circuit board 11, the magnetic flux is blocked.

In addition to the above, because in the mobile terminal power receiving module 1 the magnetic powder dispersed in the resin is insulation-coated, the short-circuit between the conductors of the coil 12 is prevented even if the gaps B between the conductors of the coil 12 are filled with the magnetic sheet 14.

In addition to the above, because in the mobile terminal power receiving module 1 the volume ratio of the insulation-coated magnetic powder to the magnetic sheet 14 is preferably arranged to be 60 Vol % to 90 Vol %, the efficiency in transmitting the electric power is improved while the short-circuit between the conductors of the coil 12 is prevented, even if the gaps B between the conductors of the coil 12 are filled with the magnetic sheet 14 including the magnetic powder with a high concentration.

In addition to the above, because in the mobile terminal power receiving module 1 the magnetic sheet 14 is arranged so that the resin in which the magnetic powder is dispersed is in B-stage, the adhesion property of the magnetic sheet 14 is improved.

Furthermore, it is possible to provide a rechargeable battery 3 having the mobile terminal power receiving module 1 above. Because the mobile terminal power receiving module 1 is thin as described above, the capacity of the rechargeable battery 3 used for a smart phone 5 or the like is sufficiently large.

Second Embodiment

Figure 5:
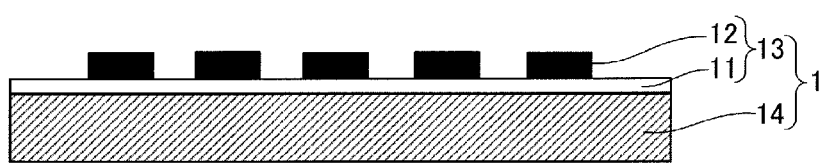
FIG. 5 illustrates the structure of a mobile terminal power receiving module according to Second Embodiment.

While the mobile terminal power receiving module 1 of First Embodiment is arranged so that the coils 12 are formed on the top and bottom surfaces of the flexible circuit board 11 to secure a sufficient number of spiral arms of the coils 12, the coil 12 may be provided only on the top surface of the flexible circuit board 11 as shown in FIG. 5. In this case, the cost down and the simplification of the manufacturing process are achieved because it is unnecessary to process the bottom surface of the flexible circuit board 11.

Third Embodiment

Figure 6:
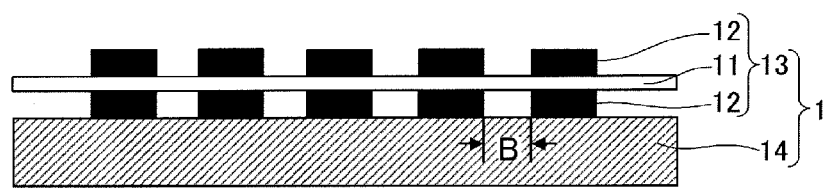
FIG. 6 illustrates the structure of a mobile terminal power receiving module according to Third Embodiment.

While the mobile terminal power receiving module 1 of First Embodiment is arranged so that the coils 12 are formed on the top and bottom surfaces of the flexible circuit board 11 and the magnetic sheet 14 fills the gaps B between the conductors of the coil 12 on the bottom surface of the flexible circuit board 11, as shown in FIG. 6, the magnetic sheet 14 may be pasted onto the sheet coil 13 without filling the gaps B between the conductors of the coil 12 on the bottom surface of the flexible circuit board 11.

Fourth Embodiment

Figure 7:
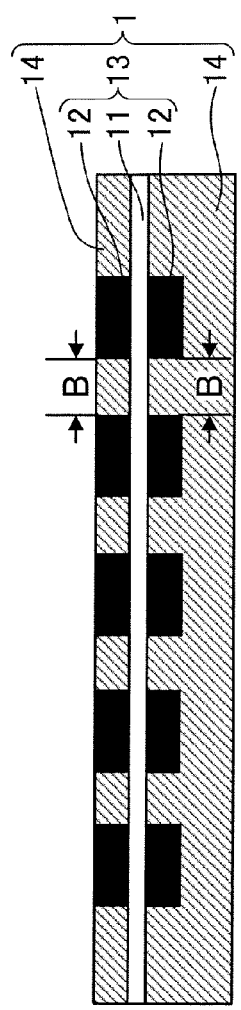
FIG. 7 illustrates the structure of a mobile terminal power receiving module according to Fourth Embodiment.

While the mobile terminal power receiving module 1 of First Embodiment is arranged so that the coils 12 are formed on the top and bottom surfaces of the flexible circuit board 11 and the magnetic sheet 14 only fills the gaps B between the conductors of the coil 12 on the bottom surface of the flexible circuit board 11, as shown in FIG. 7, the magnetic sheet 14 may be provided to fill only the gaps B between the conductors of the coil 12 provided on the top surface of the flexible circuit board 11. The magnetic sheet 14, however, must not cover the entirety of the coil 12 on the top surface of the flexible circuit board 11. This is because, when the magnetic sheet 14 entirely covers the coil 12 on the top surface of the flexible circuit board 11, the magnetic flux generated by the coil 12 is blocked. According to the embodiment, because only the gaps B between the conductors of the coil 12 on the top surface of the flexible circuit board 11 are filled with the magnetic sheet 14, it is possible to improve the efficiency in the power transmission from the power transmitting module 7 to the mobile terminal power receiving module 1.

In the mobile terminal power receiving module 1 shown in FIG. 7, the efficiency in the power transmission from the power transmitting module 7 to the mobile terminal power receiving module 1 is improved as the magnetic sheet 14 is provided on each of the top and bottom surfaces of the flexible circuit board 11. Furthermore, because only the gaps B between the conductors of the coil 12 is filled with the magnetic sheet 14 on the top surface side of the flexible circuit board 11, the magnetic flux is not blocked at the time of power transmission from the power transmitting module 7. On the other hand, the magnetic flux is blocked on the bottom surface side of the flexible circuit board 11 because the coil 12 is covered with the magnetic sheet 14 not only at the gaps between the conductors of the coil 12 but also on the entirety of the coil 12.

Fifth Embodiment

Figure 8:
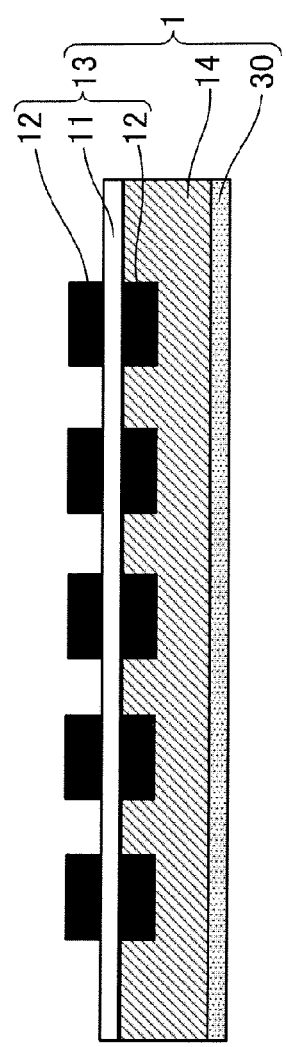
FIG. 8 illustrates the structure of a mobile terminal power receiving module according to Fifth Embodiment.

While the mobile terminal power receiving module 1 of First Embodiment employs the magnetic sheet 14 in which the magnetic powder is dispersed in the resin, as shown in FIG. 8, the magnetic sheet 14 may be arranged so that an adhesive layer 30 mainly composed of an adhesive is provided on a surface of the sheet which surface is not adhered to the sheet coil 13. For example, the magnetic sheet 14 made of resin cannot be adhered to the rechargeable battery 3 depending on the property of a material covering the rechargeable battery 3. Even in such a case, the mobile terminal power receiving module 1 is certainly adhered to the rechargeable battery 3 when the adhesive layer 30 having high adhesion property is provided.

Sixth Embodiment

While in the mobile terminal power receiving module 1 of First Embodiment the magnetic powder dispersed in the resin in the magnetic sheet 14 is insulation-coated, the magnetic powder may not be insulation-coated.

Figure 9:
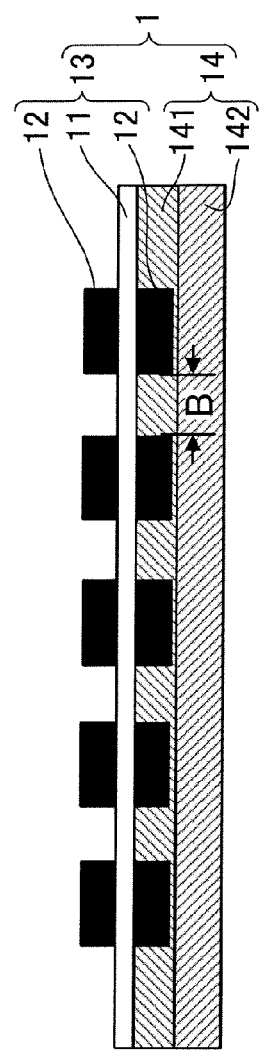
FIG. 9 illustrates the structure of a mobile terminal power receiving module according to Sixth Embodiment.

However, when the magnetic powder in the magnetic sheet 14 is not insulation-coated, the particles of the magnetic powder in the magnetic sheet 14 filling the gaps B between the conductors of the coil 12 may contact one another, and the conductors of the coil 12 may short-circuit. To prevent such short-circuiting, as shown in FIG. 9, the magnetic sheet 14 may be arranged to include a low-density layer 141 in which the density of the magnetic powder with respect to the resin is low at the part closely contacting the coil 12 and a high-density layer 142 in which the density of the magnetic powder with respect to the resin is higher than the density in the low-density layer 141 at the part not closely contacting the coil 12. With this arrangement, because in the magnetic sheet 14 the low-density layer 141 in which the density of the magnetic powder with respect to the resin is low is provided at the part closely contacting the coil 12, the short-circuiting of the conductors of the coil 12 is prevented even if the gaps B between the conductors of the coil 12 are filled with the magnetic sheet 14. In the meanwhile, the efficiency in the power transmission is improved because the high-density layer 142 in which the density of the magnetic powder dispersed in the resin is higher than the density in the low-density layer 141 is provided at the part not closely contacting the coil 12.

Seventh Embodiment

Figure 10:
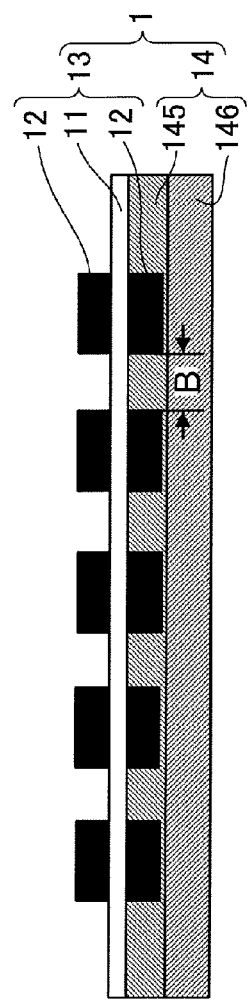
FIG. 10 illustrates the structure of a mobile terminal power receiving module according to Seventh Embodiment.

In the meanwhile, when the magnetic powder in the magnetic sheet 14 is not insulation-coated, as shown in FIG. 10, the magnetic sheet 14 may be arranged so that, for the prevention of the short-circuiting, a low magnetic permeability layer 145 in which the magnetic powder having low magnetic permeability is dispersed in the resin is provided at the part closely contacting the coil 12 whereas a high magnetic permeability layer 146 in which the magnetic powder having high magnetic permeability as compared to the low magnetic permeability layer 145 is dispersed in the resin is provided at the part not closely contacting the coil 12. According to this arrangement, because the low magnetic permeability layer 145 in which the magnetic powder having low magnetic permeability is dispersed in the resin is provided at the part closely contacting the coil 12 of the magnetic sheet 14, the short-circuiting of the conductors of the coil 12 is prevented even if the gaps B between the conductors of the coil 12 are filled with the magnetic sheet 14. On the other hand, because the high magnetic permeability layer 146 in which the magnetic powder having high magnetic permeability as compared to the low magnetic permeability layer 145 is dispersed in the resin is provided at the part not closely contacting the coil 12, the efficiency in the power transmission is improved.

Other Embodiments

In addition to the above, plural types of magnetic powders may be dispersed in the resin constituting the magnetic sheet 14. In this case, the plural types of magnetic powders may be evenly dispersed in the resin, or, as shown in FIG. 10, the type of the magnetic powder dispersed in the low magnetic permeability layer 145 is arranged to be different from the type of the magnetic powder dispersed in the high magnetic permeability layer 146.

In addition to the above, while in the mobile terminal power receiving module 1 of the embodiment above the magnetic sheet 14 employs resin in which magnetic powder is dispersed, the resin may be replaced with adhesive. Examples of the adhesive include rubber adhesive, acrylic adhesive, silicon adhesive, and urethane adhesive. The adhesion property of the magnetic sheet 14 is further improved when the resin is replaced with adhesive as above.

The detailed description of the present invention provided hereinabove mainly focused on characteristics thereof for the purpose of easier understanding; however, the scope of the present invention shall be construed as broadly as possible, encompassing various forms of other possible embodiments, and therefore the present invention shall not be limited to the above description. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. To fully understand the object and effects of the present invention, it is strongly encouraged to sufficiently refer to disclosures of documents already made available.

What is claimed is:

1. A mobile terminal power receiving module implementing a wireless power transmission method of transmitting electric power between a power transmitting module and a power receiving module by wireless, comprising:
    a sheet coil in which at least one coil constituted by conductors is formed on a substrate as a circuit pattern; and
    a magnetic sheet made of resin in which magnetic powder is dispersed, wherein,
    in the sheet coil, the at least one coil is provided on each of a top surface and a bottom surface of the substrate as the circuit pattern,
    the magnetic sheet is provided on the bottom surface of the substrate so as to cover the coil thereon, filling up each gap between turns of the coil, and
    both of the top surface and the bottom surface of the substrate are from the same substrate.

2. The mobile terminal power receiving module according to claim 1, wherein,
    on the top surface of the substrate, only a gap between the conductors of the coil on the top surface of the substrate is filled with the magnetic sheet.

3. The mobile terminal power receiving module according to claim 2, wherein,
    the magnetic sheet is provided to cover the at least one coil provided on the bottom surface of the substrate.

4. The mobile terminal power receiving module according to claim 1, wherein,
    in the magnetic sheet, the magnetic powder dispersed in the resin is insulation-coated.

5. The mobile terminal power receiving module according to claim 4, wherein,
    the volume ratio of the insulation-coated magnetic powder to the magnetic sheet falls within a range of 60 Vol % to 90 Vol %.

6. The mobile terminal power receiving module according to claim 1, wherein,
    the magnetic sheet includes a low-density layer in which the density of the magnetic powder with respect to the resin is low at a part closely contacting the at least one coil and a high-density layer in which, at a part not closely contacting the at least one coil, the density of the magnetic powder dispersed in the resin is higher than the density in the low-density layer.

7. The mobile terminal power receiving module according to claim 1, wherein, the magnetic sheet includes a low magnetic permeability layer in which the magnetic powder dispersed in the resin has a low magnetic permeability at a part closely contacting the at least one coil and a high magnetic permeability layer in which, at a part not closely contacting the at least one coil, the magnetic powder dispersed in the resin has a magnetic permeability higher than the magnetic permeability of the low magnetic permeability layer.

8. The mobile terminal power receiving module according to claim 1, wherein, in the magnetic sheet, the resin in which the magnetic powder is dispersed is in B-stage.

9. The mobile terminal power receiving module according to claim 1, wherein, the magnetic sheet is made of an adhesive instead of the resin.

10. A mobile terminal rechargeable battery comprising:

the mobile terminal power receiving module of any one of claims 1, and 2 to 9.

\* \* \* \* \*